United States Patent [19]

Widseth

[11] Patent Number: 4,952,119
[45] Date of Patent: Aug. 28, 1990

[54] TIP BRAKE MECHANISM FOR A WIND GENERATOR BLADE

[75] Inventor: Richard A. Widseth, Crookston, Minn.

[73] Assignee: Phoenix Industries of Crookston Ltd., Crookston, Minn.

[21] Appl. No.: 410,592

[22] Filed: Sep. 21, 1989

[51] Int. Cl.⁵ .......................... F03D 7/04; F03D 7/06
[52] U.S. Cl. .......................................... 416/3; 416/33
[58] Field of Search ............... 416/3, 23, 32 A, 32 R, 416/51 A, 89 A, 169 B, DIG. 7

[56] References Cited

U.S. PATENT DOCUMENTS

| | | | |
|---|---|---|---|
| 2,074,149 | 3/1937 | Jacobs | 416/DIG. 7 |
| 2,391,778 | 12/1945 | Gregor | 416/51 R |
| 2,677,539 | 5/1954 | Winslow | 416/3 |
| 3,891,247 | 6/1975 | Jacobs et al. | 416/32 A |
| 4,355,955 | 10/1982 | Kisovec | 416/51 A X |
| 4,374,631 | 2/1983 | Barnes | 416/89 A X |
| 4,495,423 | 1/1985 | Rogers | 416/89 A X |
| 4,575,309 | 3/1986 | Brown | 416/32 A X |
| 4,653,982 | 3/1987 | Kojima et al. | 416/3 X |
| 4,715,782 | 12/1987 | Shimmel | 416/32 A |

FOREIGN PATENT DOCUMENTS

| | | | |
|---|---|---|---|
| 866145 | 2/1953 | Fed. Rep. of Germany | 416/51 A |
| 1250554 | 12/1960 | France | 416/51 A |
| 135761 | 10/1981 | Japan | 416/DIG. 7 |
| 175276 | 8/1986 | Japan | 416/3 |
| 636411 | 5/1983 | Switzerland | 416/51 A |
| 2156006 | 10/1985 | United Kingdom | 416/89 A |

Primary Examiner—Edward K. Look
Assistant Examiner—Hoang Nguyen
Attorney, Agent, or Firm—Zarley, McKee, Thomte, Voorhees & Sease

[57] ABSTRACT

A tip brake is described for use on the blade of a wind generator so that the tip will be rotated relative to the remainder of the blade to slow the rotation of the rotor. The tip of the blade is rotatable, about its longitudinal axis, with respect to the remainder of the blade. A brake mechanism interconnects the blade tip with the remainder of the blade to cause the blade tip to be rotated when the blade is subjected to a predetermined amount of centrifugal force. Once the blade tip has been deployed to slow rotation of the rotor, it will remain deployed until the wind becomes very low or the rotor is manually slowed so that the spring can cause the tip to be reset.

3 Claims, 6 Drawing Sheets

TIP BRAKE MECHANISM FOR A WIND GENERATOR BLADE

BACKGROUND OF THE INVENTION

This invention relates to a tip brake mechanism for a wind generator blade and more particularly to a tip brake mechanism which is designed to rotate the tip of a wind generator blade so as to slow the rotation of the rotor when a malfunction occurs in the other features of the machine which are designed to keep the rotor at a uniform speed.

Wind generators are normally comprised of a bladed rotor shaft which is connected to a gear box which in turn is connected to a generator. A mechanical brake assembly is also normally provided for preventing the blade from rotating during periods of non-use and for stopping the machine if there is a grid failure or other failure which which would allow the rotor to free wheel or go into overspeed. The mechanical braking system for the wind generator will also occasionally malfunction and the tips must deploy to keep the generator from going into overspeed.

One type of prior art braking device causes the tip of the blade to be rotated about its longitudinal axis, relative to the remainder of the blade so as to slow the rotation of the blade. In the AeroStar mechanism, a spring which is loaded to approximately 1200 pounds pressure serves as the governor. Thus, in the AeroStar mechanism, approximately 1200 pounds of centrifugal force must be exerted on the tip for the brake mechanism to deploy. Consequentially, once deployed, the 1200 pound spring pressure is attempting to reset the tip and does so once the blades have slowed sufficiently to overcome the combined aerodynamic and centrifugal forces which are keeping them deployed. Unfortunately this sends the machine back into overspeed and the cycle repeats. This creates quite a destructive situation on the blades and the tip mechanism as they may cycle in and out for many hours.

The AeroStar mechanism is undampened and each tip deployment and reset imposes severe shock loads upon the entire blade and machine structure. This requires additional structural material to be used in manufacture of the blades to handle the extreme loads.

Further, the AeroStar tip mechanism is also heavy and the weight is distributed toward the tip, which also increases the blade structural material necessary to adequately carry the load of normal operation.

The AeroStar tip mechanism is bulky and must be serviced from a hole in the end of the blade tip. The new airfoils designed for wind turbines are thinner and do not have the internal space to house the AeroStar tip mechanism.

It is therefore a principal object of the invention to provide an improved tip brake mechanism for a wind generator blade.

A further object of the invention is to provide a tip brake mechanism for a wind generator blade which causes the tip to be deployed when subjected to approximately 1200 pounds of centrifugal force but which will not be reset until the centrifugal force drops to approximately 200 pounds.

A further object of the invention is to provide a tip brake mechanism for a wind generator blade wherein the trigger and the reset mechanism are separately controlled.

Still another object of the invention is to provide a tip brake mechanism for a wind generator blade which reduces the shock loads to both blade and turbine associated with overspeed tip deployment and reset.

Yet another object of the invention is to provide a tip brake mechanism for a wind generator blade which is lighter than the prior art devices.

Still another object of the invention is to provide a tip brake mechanism for a wind generator blade which is mounted relatively close to the blade root thereby permitting the utilization of a lighter tip.

Still another object of the invention is to provide a tip brake mechanism for a wind generator blade which enables the blade to be constructed with less structural materials.

Still another object of the invention is to provide a tip brake mechanism where in the blade tips are easily removable for repair, maintenance or exchange.

Yet another object of the invention is to provide a tip brake mechanism for a wind generator blade wherein a majority of the mechanism is easily replaceable.

Still another object of the invention is to provide a tip brake mechanism for a wind generator blade which is economical of manufacture, durable in use and refined in appearance.

These and other objects of the present invention will be apparent to those skilled in the art.

SUMMARY OF THE INVENTION

A tip brake mechanism is described which is utilized in the blade of wind generator to rotate the blade tip when the rotor goes into overspeed. The blade includes a root portion which extends from the hub to the tip cut line and a tip portion which is selectively rotatable with respect to the remainder of the blade when the blade tip is subjected to approximately 1200 pounds centrifugal force. The blade tip has an elongated carbon fiber spar secured thereto which extends approximately 30 feet inwardly therefrom. The spar is received within a metal tube positioned in the end of the blade root portion. The inner end of the spar is secured to one end of a cam shaft which has a pair of cam grooves or surfaces formed in the periphery thereof. A cam shaft housing is embedded in the blade root and has a pair of guide pins extending therefrom which are received in the cam grooves of the cam shaft. One end of the cam shaft is secured to one end of a piston which is normally held against longitudinal movement by a magnet. A spring is associated with the piston for urging the piston back into magnetic engagement with the magnet after the tip has been deployed and the centrifugal force has been reduced by the slowing of the blade. Preferably, the magnet and the spring holds the piston in engagement therewith until the tip blade tip is subjected to approximately 1200 pounds centrifugal force. When the blade tip is subjected to 1200 pounds centrifugal force, the piston releases causing the cam shaft to rotate and longitudinally move thereby causing the blade tip to be rotated relative to the remainder of the blade so as to slow the rotation of the blade.

DESCRIPTION OF THE PREFERRED EMBODIMENT

The numeral 10 refers to a blade of a wind generator 11 having an inner end 12 and an outer end 14. For purposes of discussion, blade 10 will be described as comprising a body portion or root portion 16 and a tip portion 18. The brake mechanism of this invention is referred to generally by the reference numeral 20 and is designed to normally maintain tip portion 18 in its reset or non-deployed condition until such time as the blade is subjected to a predetermined amount of centrifugal force and to thereupon rotate the tip portion 18 relative to main body portion 16 to alter the pitch, thereby spoiling the aerodynamic lift and increasing drag, of the tip portion 18 so that the blade will be slowed to prevent destruction of the system.

An elongated carbon fiber spar 22 is embedded in tip portion 18 and extends inwardly approximately 3½ feet therefrom. A plurality of cylindrical ring-like bearings 24 embrace the spar 22 and are received within a metal or composite tube 26 which is mounted in the outer end of the main body portion 16.

Mechanism 20 includes a cam shaft housing 28 which is embedded or molded in the body portion 16 and which has a cylindrical bore 30 extending therethrough. The outer end of bore 30 is enlarged to define a shoulder 32. Cam shaft housing 28 is provided with a pair of opposing threaded bores 34 and 36 into which are threaded guide pins 38 and 40 respectively.

An elongated cylindrical cam shaft 42 is longitudinally movably positioned in bore 30 of cam shaft housing 28 and is also rotatably mounted therein. Cam shaft 42 is provided with a reduced diameter portion 44 at its outer end which is provided with gripping threads 46. Cam shaft 42 is provided with a pair of cam grooves 48 and 50 which are adapted to receive the inner ends of the guide pins 34 and 36 respectively. Thus, longitudinal movement of cam shaft 42 relative to cam shaft housing 28 will cause the cam shaft 42 to be rotated as well due to the relationship of the guide pins 38–40 and the grooves 48–50 respectively. Although it is preferred that a pair of guide pins and cam grooves be utilized, other numbers of guide pins and grooves may be utilized.

As seen in the drawings, the inner end of cam shaft 42 is provided with a recessed area 52 adapted to receive the outer end of rod 54 of piston 56. Cam shaft housing 26 is provided with a bore 58 extending thereinto which communicates with the recessed area 52. Rod 54 is connected to the cam shaft 42 by means of pin 60 which is extended through opening 58 so that its threaded head portion 62 may be threadably received by the threaded bore 64 in the outer end of rod 54.

Figure 3:
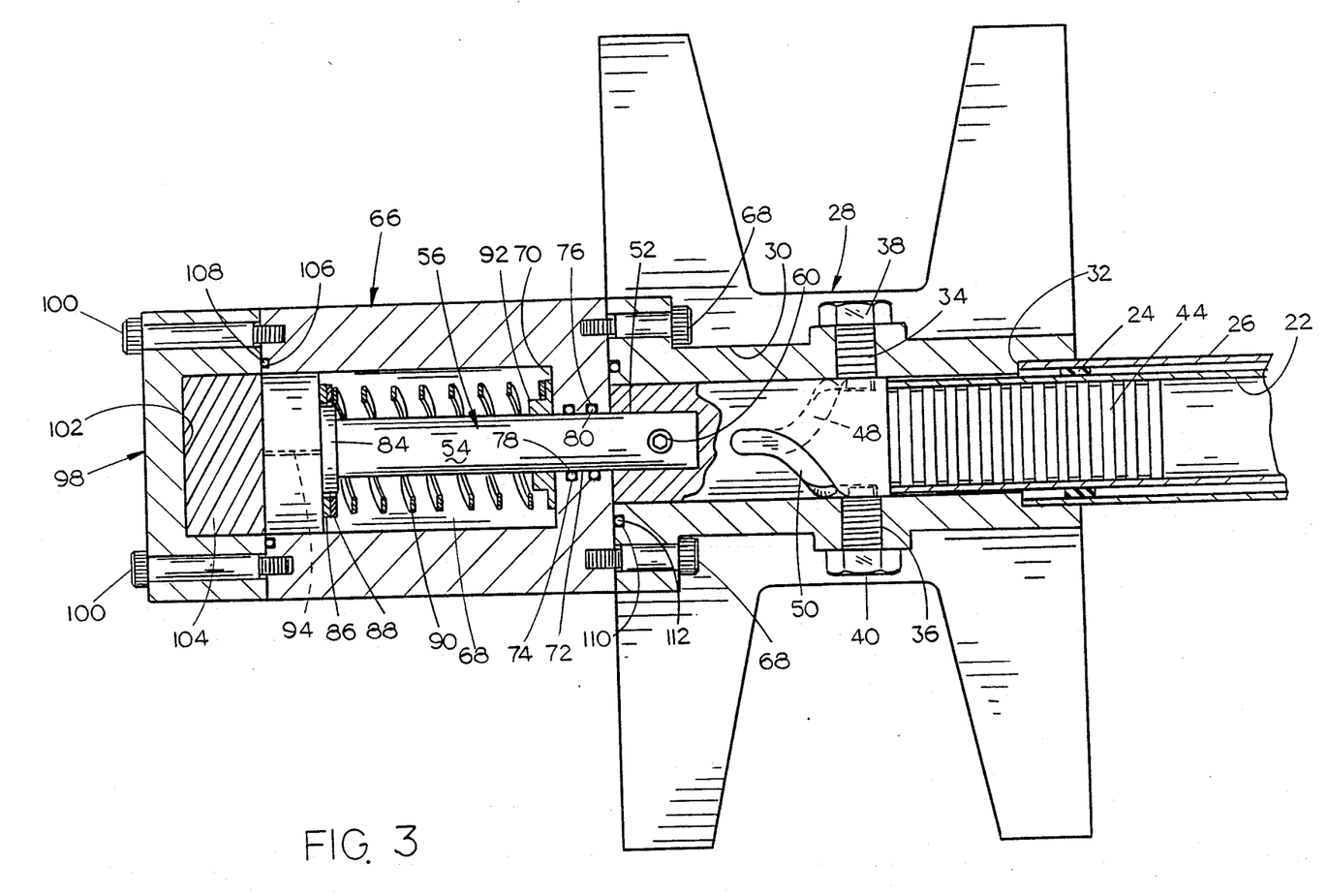
FIG. 3 is a longitudinal sectional view of the tip brake mechanism of this invention.
Figure 4:
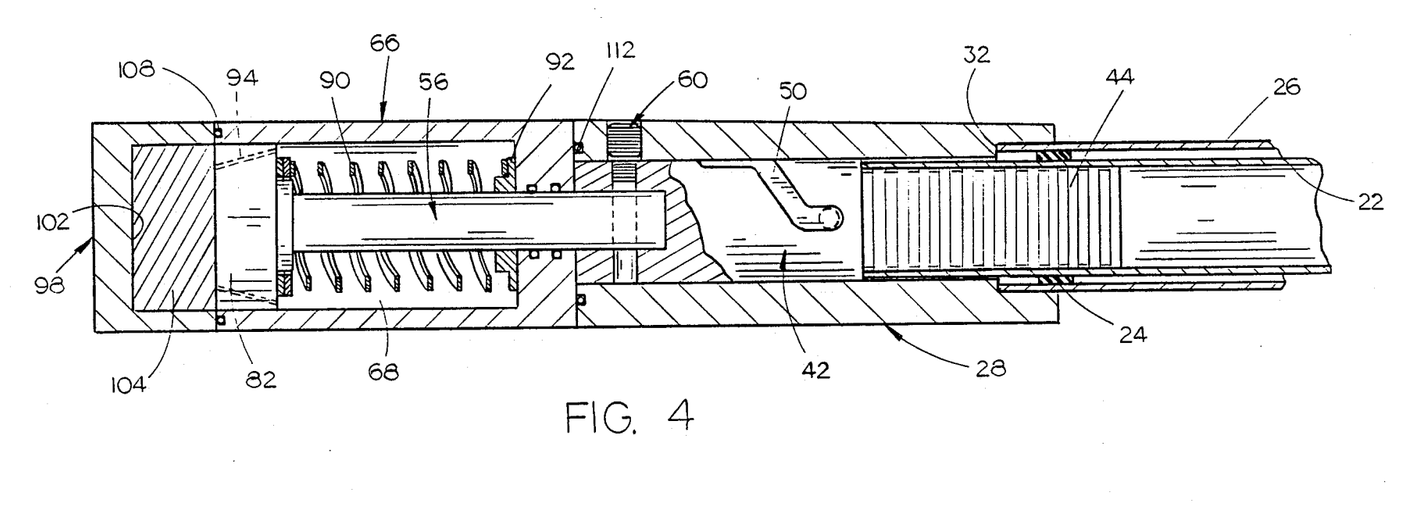
FIG. 4 is a partial longitudinal sectional view of the invention with the brake mechanism in its normal position.
Figure 5:
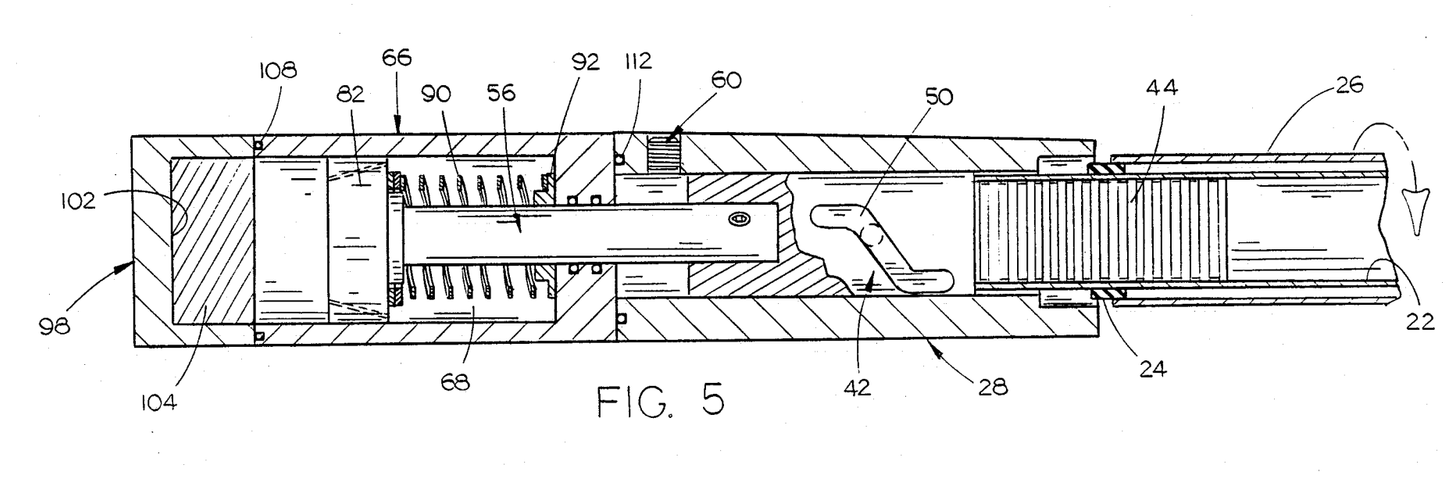
FIG. 5 is a view similar to FIG. 4 except that the brake mechanism has been partially deployed.
Figure 6:
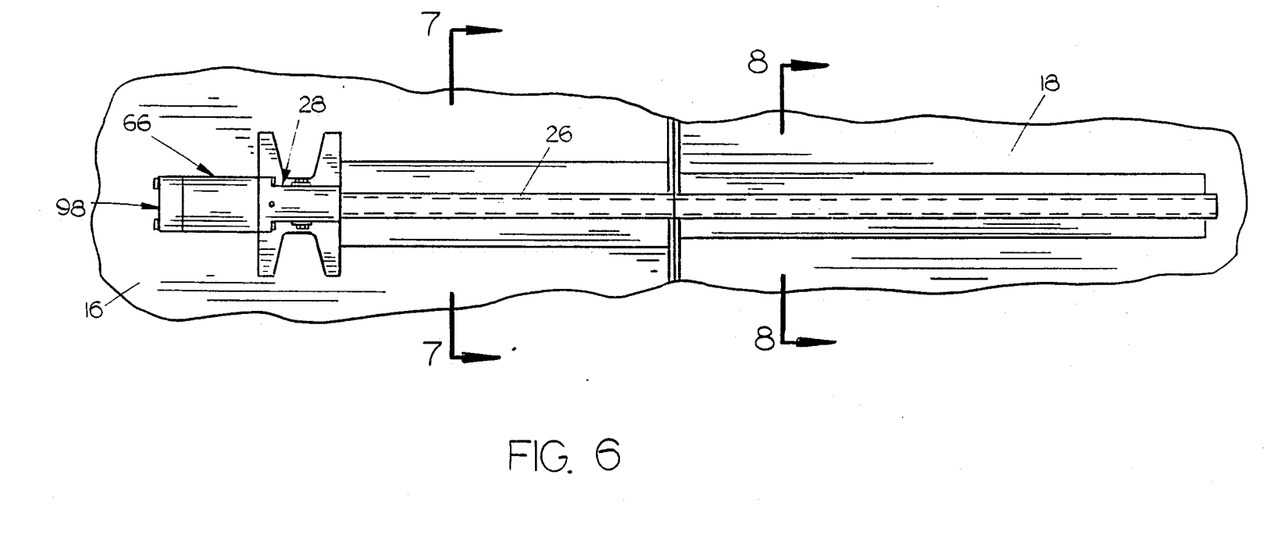
FIG. 6 is a partial elevational view of a wind generator blade having a portion thereof removed so as to illustrate the tip brake mechanism of this invention.
Figure 7:
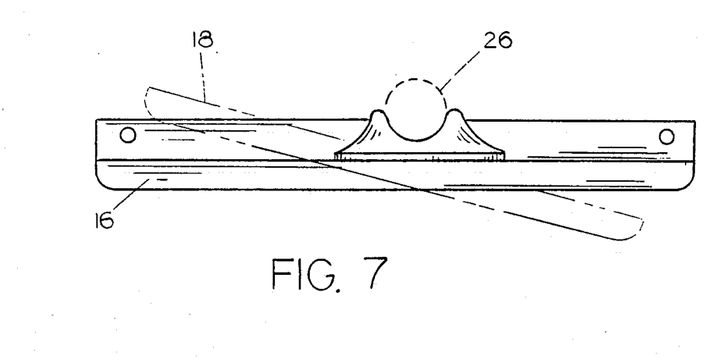
FIG. 7 is a sectional view seen on line 7—7 of FIG. 6 with the broken lines illustrating the manner in which the blade tip is deployed.
Figure 8:
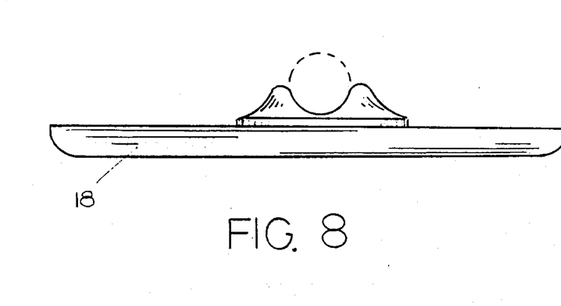
FIG. 8 is an enlarged sectional view seen on line 8—8 of FIG. 6.
Figure 9:
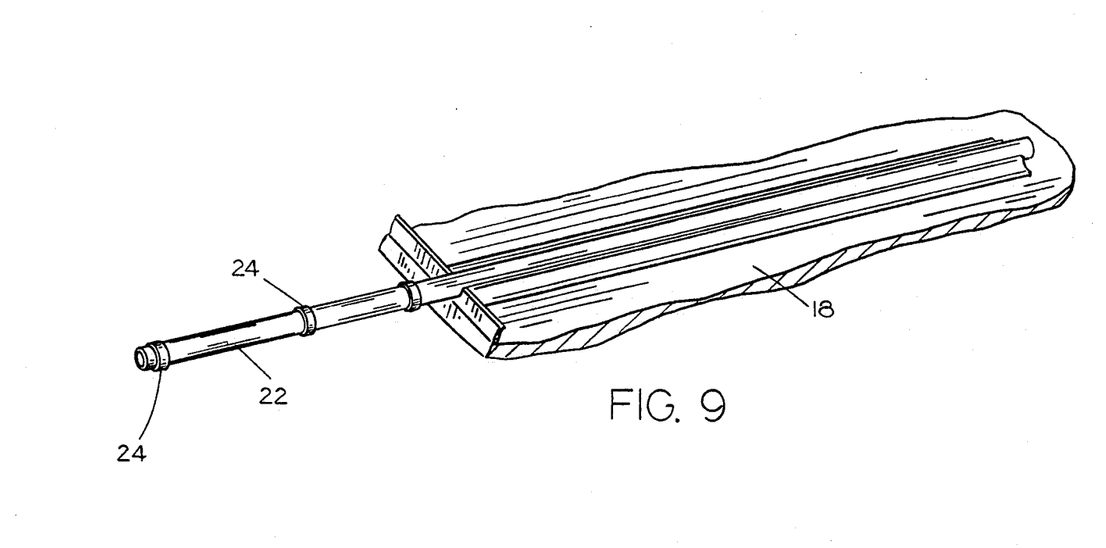
FIG. 9 is a perspective view of a portion of the blade tip having a portion of the brake mechanism mounted therein.
Figure 10:
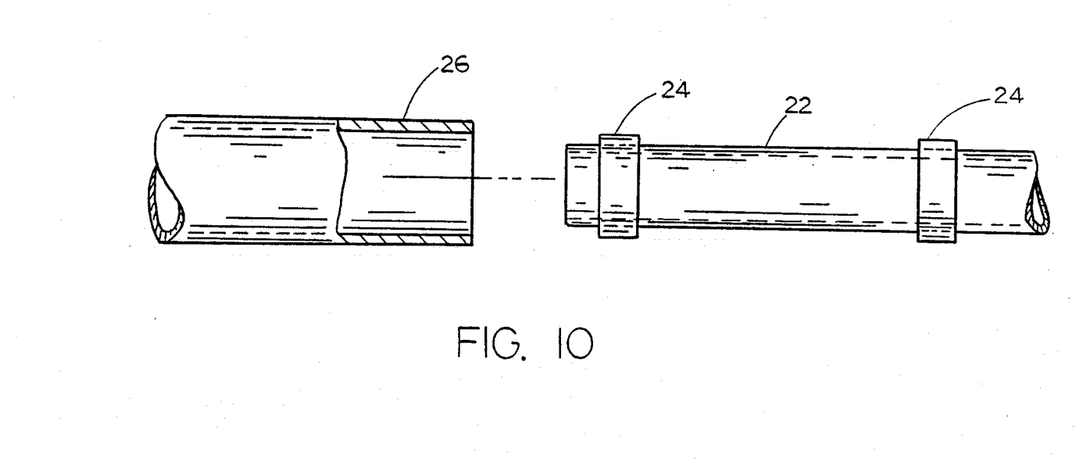
FIG. 10 is an elevational view of the spar and its receiving tube.

Cylinder block 66 is secured to the inner end of cam shaft housing 28 by cap screws 68 as seen in the drawings. Cylinder block or housing 66 is provided with a cylinder 68 formed therein which extends into the inner end thereof as seen in FIG. 3. Cylinder 68 terminates at shoulder 70 as seen in FIG. 3. Cylinder block 66 is provided with an opening or bore 72 which extends outwardly from the end of the cylinder 68 to permit the rod 54 to extend therethrough. Cylinder block 66 is also provided with a pair of annular grooves 74 and 76 formed therein which communicate with bore 72 to permit rod seals 78 and 80 to be mounted therein for sealably embracing the outer surface rod 54.

Figure 1:
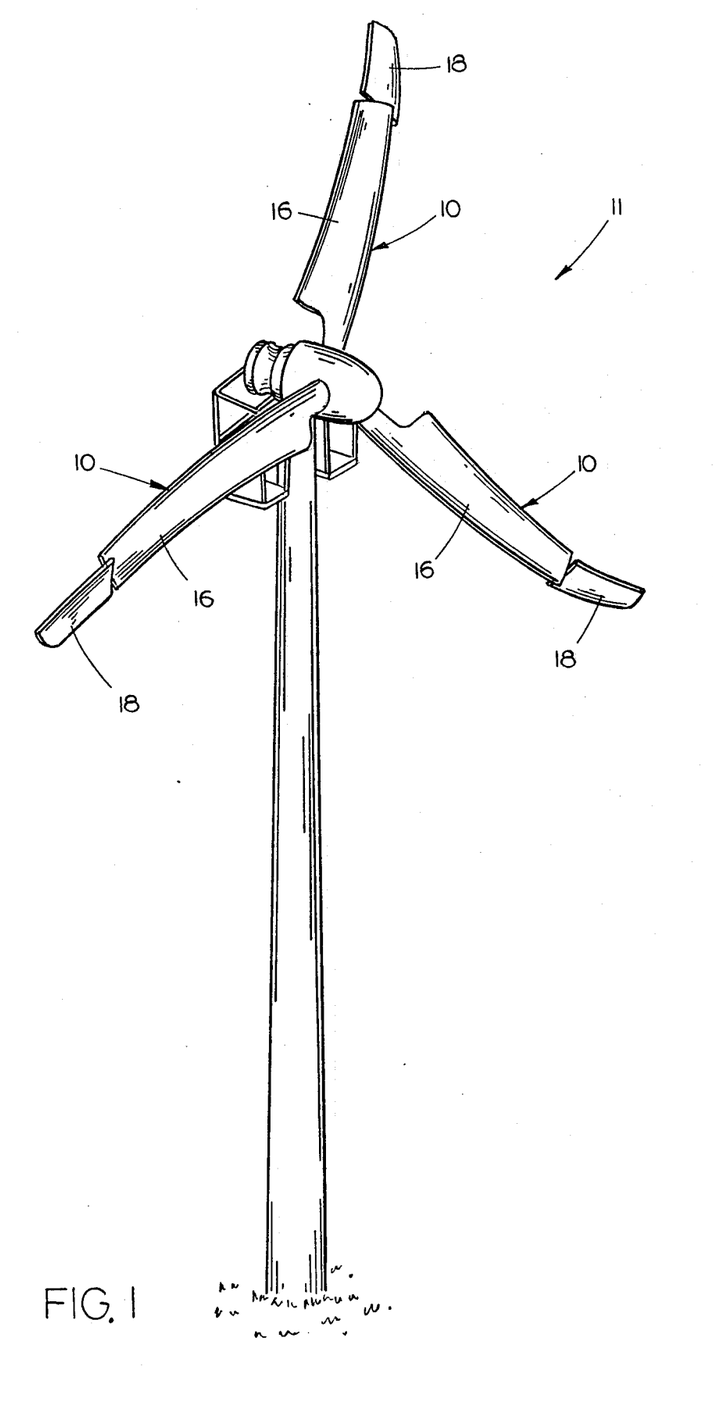
FIG. 1 is a perspective view of a wind generator employing the tip brake mechanism of this invention and which illustrates the tips in a deployed condition.
Figure 2:
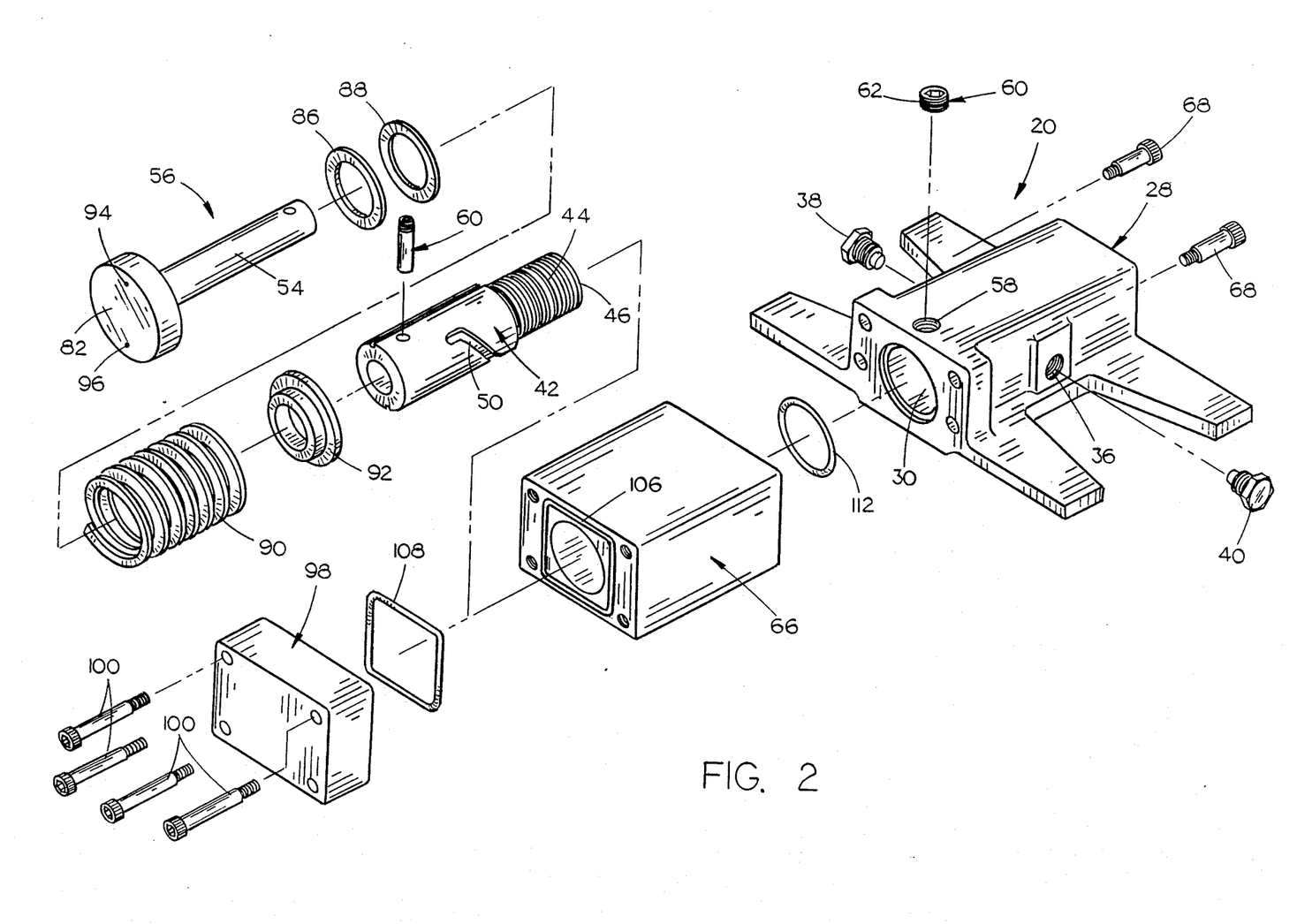
FIG. 2 is a partial exploded perspective view of the tip brake mechanism of this invention.

Piston 56 includes a piston head 82 mounted on the inner end of rod 54 best illustrated in FIGS. 2 and 3. Shoulder 84 (FIG. 3) is provided at the outer end of piston 82 and has a thrust bearing 86 and washer 88 mounted thereon. Spring 90 is positioned between the outer end of piston head 82 and shoulder 80 and is held in Position by a spring guide collar 92 which is mounted on rod 54 within cylinder 68. Cylinder 68 is filled with oil which will be forced through the bores 94 and 96 in head portion 82 to slow or dampen the movement of the piston 56 when the blade tip is deployed and when the blade tip is reset.

Magnet block 98 is secured to the inner end of cylinder block 66 by cap screws 100. The outer end of magnet block 98 is provided with a recess 102 formed therein in which the magnet 104 is mounted. Although it is preferred that a permanent magnet be utilized, an electro-magnet will also conceivably work. The inner end of cylinder block 66 is provided with a groove 106 in which a seal 108 is positioned and which is compressed between the magnet block 98 and the cylinder block 66 when the screws 100 are tightened to prevent the leakage of oil from the mechanism. Similarly, the outer end of cylinder block 66 is provided with annular groove 110 which extends around the bore 72 for receiving an O-ring 112 therein which is compressed when the cylinder block 66 is secured to the cam shaft housing 28 to prevent leakage of oil from the mechanism.

Preferably, the magnet force of the magnet 104 is approximately 1000 pounds and the force of the spring 90 is approximately 200 pounds so that the piston 56 will be held against the magnet 104 until the mechanism is subjected to approximately 1200 pounds of centrifugal force. Preferably, the strength of the spring 90 is approximately 200 pounds so that only 200 pounds of force will be acting against the piston to urge the piston back toward its magnetic engagement with magnet 104. The strength of the magnet 104 and spring 90 will vary depending on the length of the rotor blade employed in the particular wind generator.

Tube 26 is received in the recessed portion 32 with the inner end of the spar 22 embracing the reduced diameter portion 44 of cam shaft 42. The carbon fiber spar 22 is epoxy bonded to the reduced diameter portion 44 with the threads 46 preventing the epoxied bonding material from slipping off from the surface of the reduced diameter portion 44 of the cam shaft 42.

In use, the magnet 104 will maintain the head portion 82 of piston 56 in close engagement therewith so that the tip portion of blade tip will be in its "working" position and will be aligned with the remainder of the blade. If the primary braking systems of the machine do not function properly and the rotor goes into overspeed centrifugal force will cause the head portion 82 to move outwardly away from magnet 104 when approximately 1200 pounds of centrifugal force is experienced thereby. The outward movement of the piston 56 is slowed or dampened by the oil in cylinder 68 being compressed and forced through the small throttling or dampening bores 94 and 96.

As the piston rod 52 moves outwardly due to the centrifugal force, the engagement of the cam grooves 48 and 50 with the guide pins 34 and 36 causes the cam shaft 42 to be rotated thereby causing the spar 22 and the blade tip 18 to be deployed or rotated relative to the main body portion of the blade. The rotation of the blade tip by the cam shaft 42 causes the pitch of the blade tip to be changed by approximately 90 degrees thereby causing the tip to act as a brake to slow the rotation of the blade. When the blade has been sufficiently slowed to enable the spring 90 to force the piston 56 back into magnetic engagement with the magnet 104, the blade tip will again be rotated to its working position. Because there is only about 200 pounds of spring pressure tending to reset the tips, they will not reset prematurely and the machine will remain under control until the wind speed becomes very low or the service personnel stop the rotor by applying the brakes or yawing it out of the wind.

It is extremely important to note the major difference between the instant invention and that of the prior art is that the trigger and the reset are separated as opposed to being a single unit as in the prior art. The construction of the instant invention permits the mechanism to be lighter in weight than the prior art device. Additionally, the instant invention permits the weight to be located much further inwardly in the blade. The construction of the brake mechanism of this invention permits the construction of a blade tip to be lighter which thereby permits the utilization of a smaller brake mechanism for deploying the tip.

The construction of the brake mechanism of this invention also permits various components of the invention to be easily replaced. The only portion of the invention that cannot be replaced is the cam shaft housing and the metal or composite tube. The remaining components may be easily removed for repair or replacement through the access door AD. For example, if it is desired to remove the tip from the remainder of the blade, it is simply necessary to remove the guide pins 38 and 40 and the pin 60 which will permit the removal of the cam shaft 42 from the cam shaft housing 28.

It should also be pointed out that because of the dash pot/shock absorber effect of the mechanism the tip will be deployed and reset softly rather than the extreme impact which is suffered by other tips which do not have this feature.

Although the preferred embodiment includes a spring 90, it is conceivable that the spring 90 could be eliminated thereby necessitating that the tips be manually reset.

Thus it can be seen that the invention accomplishes at least all of its stated objectives.

I claim:

1. In combination,
a rotor blade for a wind generator including a main blade portion having inner and outer ends, and a blade tip portion mounted at the outer end thereof,
a tip brake mechanism interconnecting said main blade portion and said blade tip portion for rotating said blade tip relative to said main blade portion, to slow the rotational speed of said rotor blade when the blade is subjected to a predetermined centrifugal force, thereby preventing damage to the wind generator,
said tip brake mechanism comprising,
a cylinder block means positioned in said main blade portion and having inner and outer ends,
said cylinder block means having an elongated, longitudinally extending cylinder formed therein which has inner and outer ends,
a piston mounted in said cylinder and being movable from an inner set position to an outer deployed position, said piston having a piston head portion at its inner end and a rod portion extending longitudinally therefrom,
a magnet block means at the inner end of said cylinder block means and having a magnet means, of a predetermined magnitude, positioned therein which is positioned adjacent said piston head portion, when said piston is in its inner set position, to yieldably maintain said piston head portion adjacent thereto until sufficient centrifugal force is exerted on said piston to move said piston away therefrom towards its deployed position,
said cylinder block means having a bore formed in its outer end,
said piston rod portion slidably extending outwardly through said bore,
a reset spring means in said cylinder which embraces said piston rod portion between said piston head portion and the outer end of said cylinder block means for resetting said piston head portion adjacent said magnet means,
said cylinder being filled with a hydraulic fluid which is compressed when said piston moves towards is deployed position,
said piston head portion having at least one bore extending therethrough for permitting the hydraulic fluid to flow therethrough for slowing the movement of said piston between its said set position and its said deployed position and for slowing the movement of said piston between its said deployed position and its said set position,
the magnet force of said magnet means being larger than the force of said reset spring means so that centrifugal force greater than the total of the magnet force of said magnet means and the force of said reset spring means is required to move said piston means from its set position towards its deployed position, and so that said piston means is moved from its said deployed position towards its said set position by the smaller force of said reset spring means acting thereon,
and means operatively interconnecting said piston rod portion and said blade tip for rotating said blade tip relative to said main blade portion when said piston means moves from its said set position to its said deployed position.

2. The combination of claim 1, wherein said spring means has a strength substantially less than the strength of said magnet means.

3. The combination of claim 1 wherein said means operatively interconnecting said piston rod portion and said tip portion comprises a cam shaft housing means mounted in said main blade portion longitudinally outwardly of said cylinder block means, a cam shaft longitudinally and rotatably movably mounted in said cam shaft housing means, said cam shaft having at least one cam groove formed in its peripheral surface, means connecting said cam shaft to said piston rod, said cam shaft housing means having at least one guide pin means mounted thereon which is in engagement with said cam groove for causing the rotating of said cam shaft when said piston moves between its said first and second positions, said blade tip having an elongates spar means secured thereto which extends longitudinally inwardly into said main blade portion, and means operatively connecting the inner end of said spar means to said cam shaft so that rotation of said cam shaft will cause said blade tip to axially rotate relative to said main blade portion, thereby breaking the speed of rotation of said rotor blade.

* * * * *